March 11, 1952  D. E. THOMPSON  2,588,777
HIGH-VOLTAGE SUPPLY
Filed Sept. 9, 1949

INVENTOR.
DONALD E. THOMPSON
BY Darby & Darby
Attorneys

Patented Mar. 11, 1952

2,588,777

UNITED STATES PATENT OFFICE 2,588,777

HIGH-VOLTAGE SUPPLY

Donald E. Thompson, Passaic, N. J., assignor to Allen B. Du Mont Laboratories, Inc., Passaic, N. J., a corporation of Delaware Application September 9, 1949, Serial No. 114,727

10 Claims. (Cl. 321—15)

My invention relates to high voltage supplies and more particularly to supplies such as used in television receivers, in which it is desirable that electrical components such as tubes and capacitors be readily replaceable.

In a television receiver in which the picture is reproduced on the fluorescent screen of a cathode-ray tube by means of a scanning electron beam, the fluorescent screen and conductive portions of the tube adjacent to it are customarily maintained at a potential 10 to 25 kilovolts positive with respect to cathode, which latter is maintained substantially at ground or chassis potential. The required positive potential is preferably obtained by rectifying an electronically generated alternating voltage having a frequency considerably higher than the usual power line frequencies, thus permitting the use of a filter capacitor of the order of 500 $\mu\mu f$. In this type of high voltage supply it is desirable that the qualities of physical rigidity, compactness, lightness of weight, stability of insulators under changes of temperature and relative humidity, ease and economy of manufacture, small expense of components, and accessibility for servicing be incorporated into the manufacturing design.

It is an object of my invention to provide a power supply incorporating all the above features in combination.

It is a second object to provide a power supply in which the filter capacitors are rigidly maintained in place and yet are easily and readily replaced in servicing.

It is a third object to provide a voltage-doubling supply in which one of the filter capacitors has neither terminal at ground potential.

It is a further object to provide a supply in which the high voltage ends of the filter capacitors are shielded against corona.

In accordance with my invention a conductive member of the type described in copending application of George D. Hulst, Serial No. 108,323, filed August 3, 1949, entitled "Power Supply," is provided with an internal spring and also with a hole in the external surface adjacent to the spring. In addition a dimple is formed in a second conductive surface opposite the hole. A terminal of a capacitor is then inserted through the hole, pressed against the spring, and the other terminal pushed into juxtaposition in the dimple. The capacitor is retained firmly and rigidly in place, until such time as it may be desirable to remove the capacitor, in which case pressure against the spring will release it.

Figure 1:
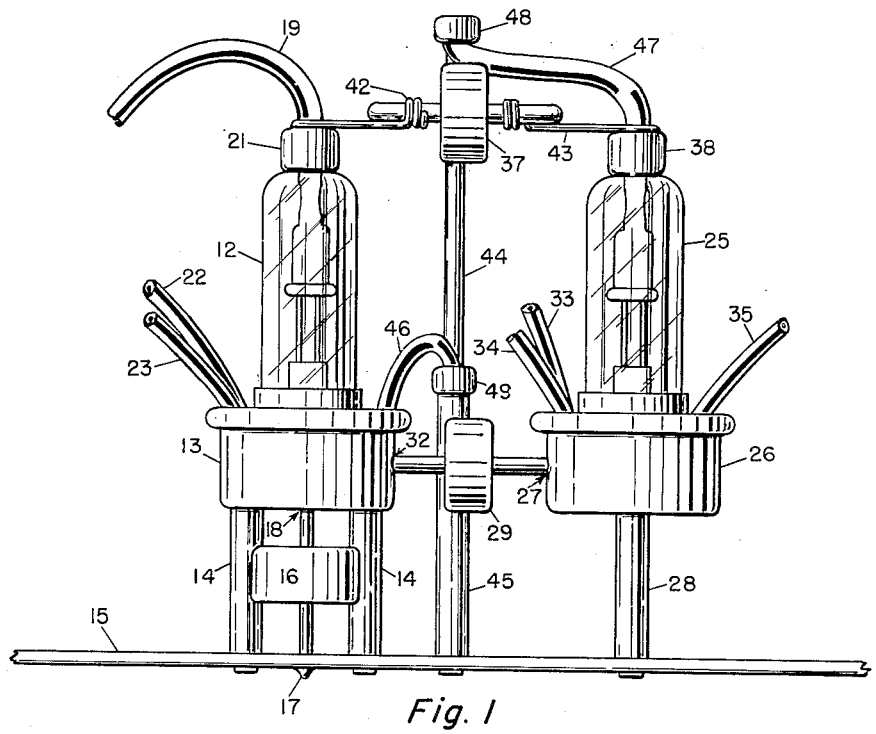
Figure 1 is a side view of a portion of a high voltage supply embodying my invention.

In Figure 1, a rectifier tube 12 is supported by an octal socket contained within and connected to a conductive member 13 which is for the most part of the type described in the above named application but containing also a spring as will be more completely described below. The conductive member 13 is in turn supported by phenolic insulating posts 14 affixed to a portion of a conductive chassis 15, which chassis structure preferably extends upwards and over the top of the entire supply in the form of a cover, enclosing the latter in a protective casing, and preventing electromagnetic radiation from the supply. A filter capacitor 16, preferably of the compact and practical ceramic type used in television, is supported by its terminals by frictional engagement between a dimple 17 in the chassis 15 and the bottom surface of the conductive member 13, the latter structure having a hole or orifice 18 through which a terminal of the capacitor enters, to engage mechanically and electrically the internal spring. The anode of the rectifier tube 12 is connected to a transformer lead 19 by means of a connector 21 having a rounded external contour to avoid corona. Transformer filament leads 22 and 23 are connected to terminals within the conductive member 13.

Similarly, a second tube 25 fits into a socket partially contained within a second conductive member 26, the latter being similar to the conductive member 13 and having a dimple 27 in one of its sides. The conducting member 26 is supported by phenolic insulating posts 28 similar to the posts 14 but preferably oriented so that the plane common to their axes is disposed at right angles with that of the posts 14. A second filter capacitor 29 is held by frictional engagement between conductive members 26 and 13, having its terminals engaged between the dimple 27 of the conductive member 26 and a second spring partially enclosed within the member 13, said second spring being adjacent to a second hole or orifice 32 in a side surface of the member 13. Transformer leads 33 and 34 and the output lead 35 are connected to terminals enclosed within the member 26.

A third capacitor 37 is suspended between and connected to the anode connectors 21 and 38 of the tubes 12 and 25 by means of springs 42 and 43, respectively. A five-watt two-megohm resistor 44 is mounted physically on a stand-off insulator 45 and connected electrically to a terminal within the conductive member 13 by means of a conductive wire 46. The other end of the resistor 44 is connected by means of a lead 47 to the connector 38 of the tube 25. Corona shields 48 and 49 are provided for the ends of the resistor 44.

Figure 2:
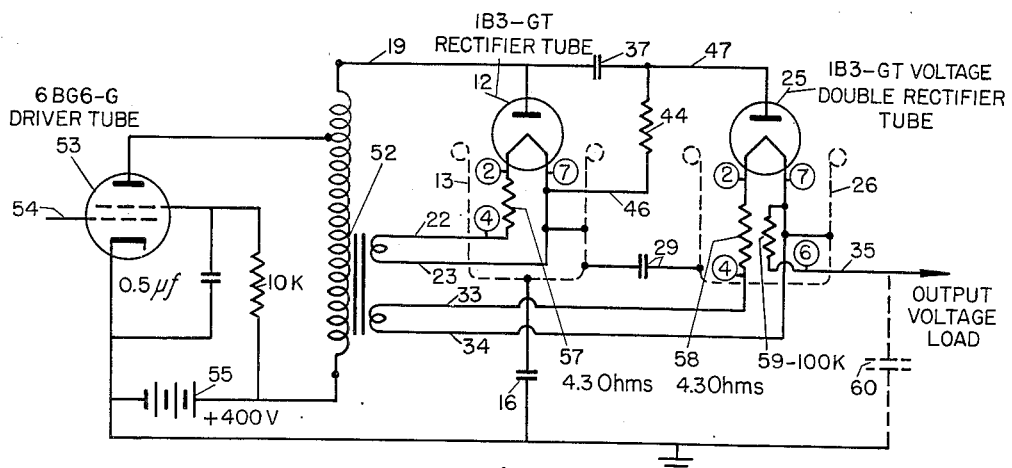
Figure 2 is a schematic diagram of the apparatus shown in part in Figure 1.

In Figure 2, where the above mentioned elements have the same numbers as before, the leads 19, 22, 23, 33, and 34 are shown attached to a transformer 52. A driver tube 53, having a control grid 54, receives its plate power from a positive source 55 through a tap on the primary winding of the transformer 52.

The conducting shielding member 13 is electrically connected to the cathode of the tube 12 as shown in Fig. 2. Likewise the conducting shielding member 26 is electrically connected to the cathode of tube 25 as indicated in Fig. 2.

Within the conductive member 13 and shielded thereby against corona is a resistor 57. This resistor is preferably mounted between terminals of the octal socket of the rectifier tube as indicated by the encircled standard octal pin numerals. Similarly, the resistors 58 and 59 are mounted as indicated on terminals of the octal socket within the conductive member 26. The distributed output capacitance-to-ground is indicated by the capacitance symbol 60, drawn in dashed lines.

The operation of the circuit shown in Fig. 2 is as follows. Current flows from the positive source 55 through the primary winding of the transformer 52 to the tap thereof and through the driver tube 53. A negative signal is then suddenly applied to the grid 54 of this tube 53, preventing the flow of current through the primary winding, which latter then becomes momentarily highly positive, causing the rectifier tube 12 to conduct, and charging the capacitor 16 to a positive potential substantially that of the positive voltage peak of the transformer 52. The capacitance 16 then substantially maintains this potential until the next charging cycle. The conductive member 13, being connected internally to this point, is charged also to this potential. Through the medium of the resistor 44 the anode of the tube 25 is maintained at this average potential, so that positive peak voltages, coupled through the capacitor 29 attain values approximately twice that of the primary of the transformer 52. The rectifier 25 conducts during these peak intervals, charging the capacitor 29 to an average potential approximately equal to that of the capacitor 16. The conductive member 26 is connected to the high potential end of the capacitor 29 and hence is charged to approximately twice the voltage of the member 13.

The filter resistor 59, together with the total output capacitance 60 provide additional filtering of alternating voltage components for the output lead 35.

Figure 3:
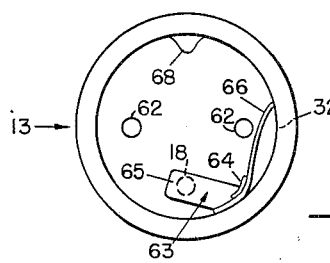
Figure 3 is the top view of a detail of the supply shown in Figure 1.

In Figure 3 is shown a top view of the conductive member 13, showing the interior thereof, before the socket assembly is mounted in place. The holes 62 are used to affix the member 13 to the insulators 14. The spring member 63, which is double-ended, thus effectively forming two independent springs, is attached in the middle to the side of the conductive member 13 by means of an eyelet 64. One end 65 of the spring 63 extends along the bottom of the member 13 adjacent to the hole 18 (shown dotted). In this position it provides downward pressure to maintain the capacitor 16 of Figure 1 rigidly in place. The other end 66 of the spring 63 extends along the side of the member 13 adjacent to the hole 32. This provides lateral pressure to hold the capacitor 29 in place.

In the preferred embodiment shown in Figure 3, a dimple 68 is formed in the conductive member. This permits the conductive member 13 to be identical to the conductive member 26, allowing a single machine tool to form both parts to afford economies in mass production, the dimple 68 being the dimple 27 of the member 26. Alternatively, if identical conductive structures are not desired, the dimple 68 might be omitted from the member 13, while in the member 26 the holes 18 and 32, the spring 63, and the eyelet 64 may be omitted.

Having the capacitor 16 mounted below the conductive member 13 is an advantage because the electrostatic field surrounding this capacitor is then in accord with the field which would be existent in this region in the absence of the capacitor as described in the copending application. The uniform field in the insulators 14 is therefore not disturbed, permitting the use of phenolic material as described in the above named application. Also, the member 13 and the chassis 15 provide corona shielding for the terminals of the capacitor 16.

The capacitor 29, on the other hand, which connects to a potential surface 26 more positive than that of the member 13, is preferably mounted on the side of the member 13 as shown, to avoid influencing the field within the insulators. The members 13 and 26 provide corona shielding for the terminals of the capacitor 29.

As an alternative form, the filter capacitor 29 might be connected between the conductive member 26 and ground. This would have the disadvantage that the voltage rating would have to be twice that in the present arrangement, thus adding unnecessarily to the cost of the supply.

It will be seen from the above that the described structure is mechanically rigid, compact, light of weight, and readily manufactured. The above structure permits the use of phenolic insulators which are not easily broken by mechanical shock or impact, or damaged during assembly. Also, by removing the cover of the supply, the components are accessible for test and replacement.

Although a specific embodiment of my invention has been shown and described, the scope of my invention is defined by the following claims.

What is claimed is:

1. In an electrical high voltage circuit a source of voltage, electrical terminals connected thereto, a pair of electrically conductive shielding members shielding and electrically connected to said terminals and having substantially parallel and planar surfaces, an impedance element extending between and connecting said members, said element having rigid terminals and being supported and retained in position by its terminals abutting respectively in frictional engagement with said shielding members, the ends of said impedance element terminals extending beyond the planes of the respective surfaces of each said shielding member.

2. In an electrical high voltage circuit a source of voltage, electrical terminals connected thereto, two conductive shielding members shielding and electrically connected to said terminals and having substantially parallel and planar surfaces, one of said members being cup-shaped and connected to operate at a voltage higher than the other of said members, and an impedance element having terminals and extending between and connecting said members, one of said members having a dimple, said element being retained in position by abutting engagement of a terminal thereof within said dimple.

3. In an electrical high voltage circuit a source of voltage, electrical terminals connected thereto, a conductive member having an orifice therein, a spring at least partially enclosed by said member, a second conductive member having a dimple, one of said members being a shield for said terminals and electrically connected thereto and an electrical impedance member having an electrical terminal thereof in contact with said dimple and supported thereby, another electrical terminal of said electrical member extending through said orifice and making contact with said spring.

4. In an electrical high voltage circuit for television a source of voltage, electrical terminals connected thereto, a conductive shielding member having a dimple, a second conductive shielding member, one of said members being a shield for said terminals and electrically connected thereto, said members being mechanically attached to one another by means of an insulator extending between adjacent surfaces of said members, and a capacitor extending between and electrically connecting said members and having an electrical terminal thereof in contact with said dimple and supported thereby.

5. The apparatus, according to claim 4, in which one of the said shielding members has an opening therein and a spring positioned to extend across said opening, said capacitor having a terminal extending through said opening and contacting said spring.

6. In an electrical high voltage circuit, a source of voltage, two sets of electrical terminals connected thereto, a first and a second electrically conductive cup-shaped shielding member shielding and electrically connected respectively to said sets of electrical terminals, a conductive chassis member, a first capacitor extending between and connecting said first and second cup-shaped member, and a second capacitor extending between and connecting one of said cup-shaped members to said chassis member, a portion of said latter cup-shaped member extending between the terminals of said capacitors connected thereto, each said capacitor being retained in position by abutting frictional engagement of the terminals thereof with said members, the ends of said terminals respectively extending beyond the plane of the surface of each of said member.

7. In an electrical high voltage circuit, a source of voltage, two sets of electrical terminals connected thereto, a pair of electrically conducting shielding members respectively shielding and electrically connected to said sets of terminals and having substantially parallel and planar surfaces, an impedance element extending between and connecting said members, said element having rigid terminals and being supported and retained in position by terminal abutting frictional engagement with said members, the ends of said terminals extending beyond the plane of the respective surfaces of each said member.

8. Electrical apparatus comprising an impedance element having two terminals attached thereto in approximate axial alignment, a first conductive member having a concave dimple in the surface thereof, a first one of said terminals being positioned against said dimple within the confines thereof, and a second conductive member having an opening in the surface thereof, the second of said terminals being positioned to extend within said opening, and a spring member positioned to resiliently engage against said second terminal and thereby resiliently force said first terminal against and within said dimple, said opening in said second conductive member being substantially the same size as said second terminal whereby the surface of said second conductive member is substantially unbroken except as necessary in order for said second terminal to extend therein.

9. Electrical apparatus comprising a plurality of conductive shield members and a plurality of impedance elements supported by said shield members, said impedance elements comprising a plurality of terminals, and each of said shield members being formed to have a first terminal receptacle comprising a concave depression on the outer surface thereof and a second terminal receptacle having an opening in said surface of sufficient size to receive one of said terminals, and a spring-like member attached to each said shield member adjacent said opening to resiliently resist the insertion of one of said terminals into said opening, said shield members being positioned so that one of the terminals of each of said impedance elements engages one of said concave depressions and another of said terminals of each of said impedance elements extends into one of said openings and engages the spring-like member associated therewith.

10. A corona shield adapted to support the terminals of electrical impedance elements, comprising a cup-shaped conductive member, a concave depression formed on the outer surface of said member to receive a terminal of one of said impedance elements, and an opening through the surface of said member to receive a terminal of a different one of said impedance elements, and a spring-like member positioned within said cup-shaped member to resiliently resist the insertion of a terminal of one of said impedance elements into said opening when said last-mentioned terminal is inserted into said opening from the outside of said cup-shaped member.

DONALD E. THOMPSON.

REFERENCES CITED

The following references are of record in the file of this patent:

UNITED STATES PATENTS

| Number | Name | Date |
| --- | --- | --- |
| 958,219 | Blake | May 17, 1910 |
| 1,137,773 | Marsden | May 4, 1915 |
| 2,235,399 | Diehl | Mar. 18, 1941 |
| 2,415,945 | Gilson | Feb. 18, 1947 |
| 2,456,475 | Wargin | Dec. 14, 1948 |